United States Patent [19]

Rank, Jr.

[11] Patent Number: 4,926,215
[45] Date of Patent: May 15, 1990

[54] CONTACT EXPOSURE UNIT

[76] Inventor: Allen H. Rank, Jr., 1416 Brook Dr., Downers Grove, Ill. 60515

[21] Appl. No.: 256,876

[22] Filed: Oct. 12, 1988

[51] Int. Cl.⁵ .......................... G03B 27/04; B65H 5/06
[52] U.S. Cl. ......................................... 355/99; 271/270
[58] Field of Search .................... 355/97, 99, 103, 111; 271/270, 273

[56] References Cited

U.S. PATENT DOCUMENTS

| | | | |
|---|---|---|---|
| 3,235,940 | 2/1966 | Taylor et al. | 226/190 |
| 3,687,552 | 8/1972 | Almond et al. | 355/113 |
| 3,814,519 | 6/1974 | Zeunen et al. | 355/103 |
| 3,833,214 | 10/1974 | Zawiski et al. | 271/270 |
| 3,897,149 | 7/1975 | Zeunen et al. | 355/97 |
| 4,280,646 | 7/1981 | Plachy | 226/190 |
| 4,302,103 | 11/1981 | Zeunen | 355/84 |
| 4,544,253 | 10/1985 | Kummerl | 354/321 |

Primary Examiner—Donald A. Griffin
Attorney, Agent, or Firm—Welsh & Katz, Ltd.

[57] ABSTRACT

A contact exposure unit for the exposure of image-containing sheet material includes a housing having upper and lower portions separated by a transverse slot extending from an infeed end to an exit end of the housing, the lower portion provided with a plurality of driven rolls, each with a segmented foam covering, the upper portion provided with a like plurality of upper idler rolls having a segmented foam covering, the segments of corresponding upper and lower rolls being in opposite relationship with each other, the upper rolls being driven principally by contact with the lower rolls, and being adapted for low friction vertical sliding action in the upper portion of the housing, and a light unit having an aperture lamp opposed by a foam covered lower roller for the exposure of sheet materials fed through the slot and pressed between the light unit and the covered roll.

21 Claims, 5 Drawing Sheets

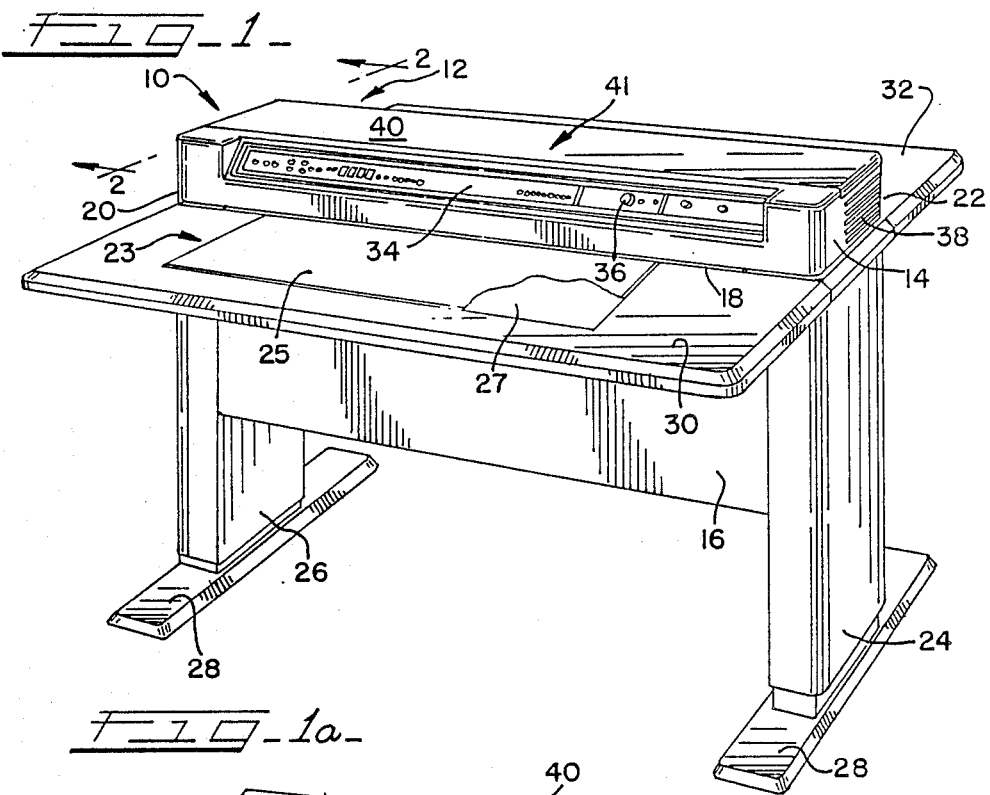
FIG_1_
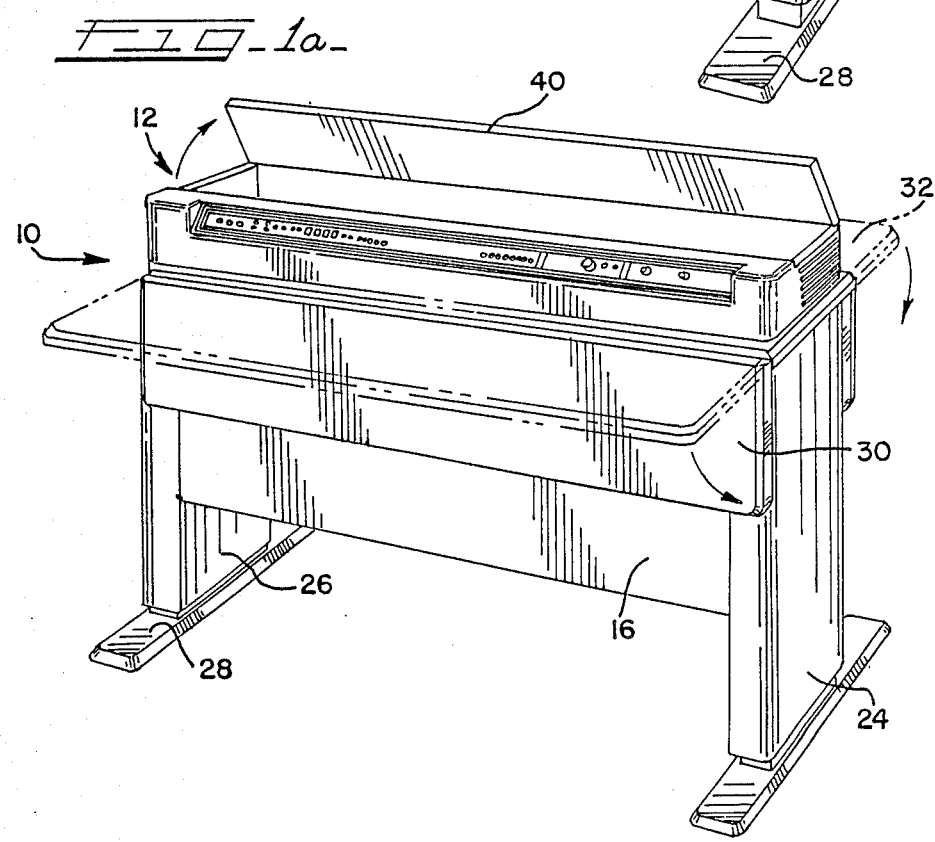
FIG_1a_

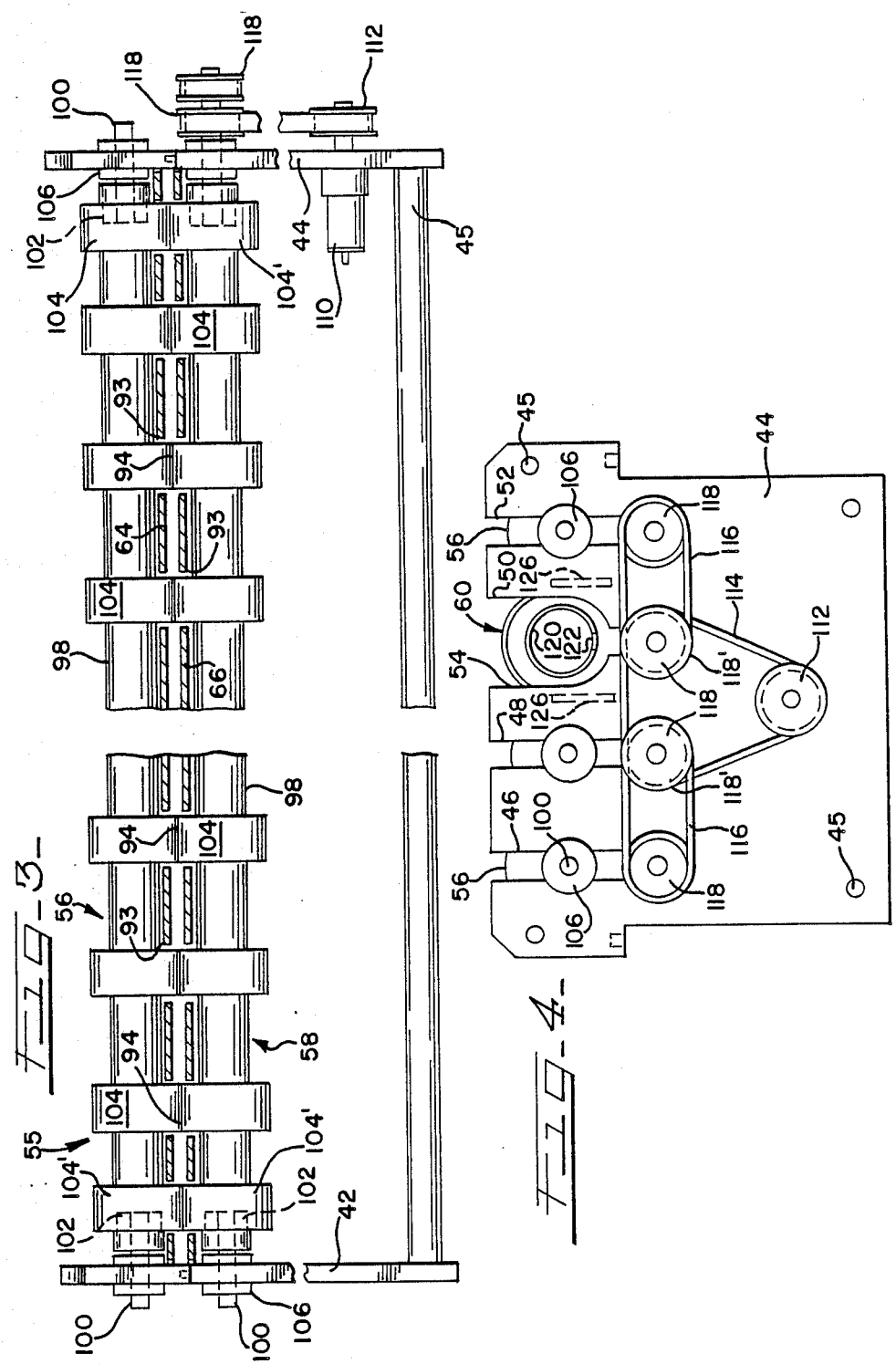

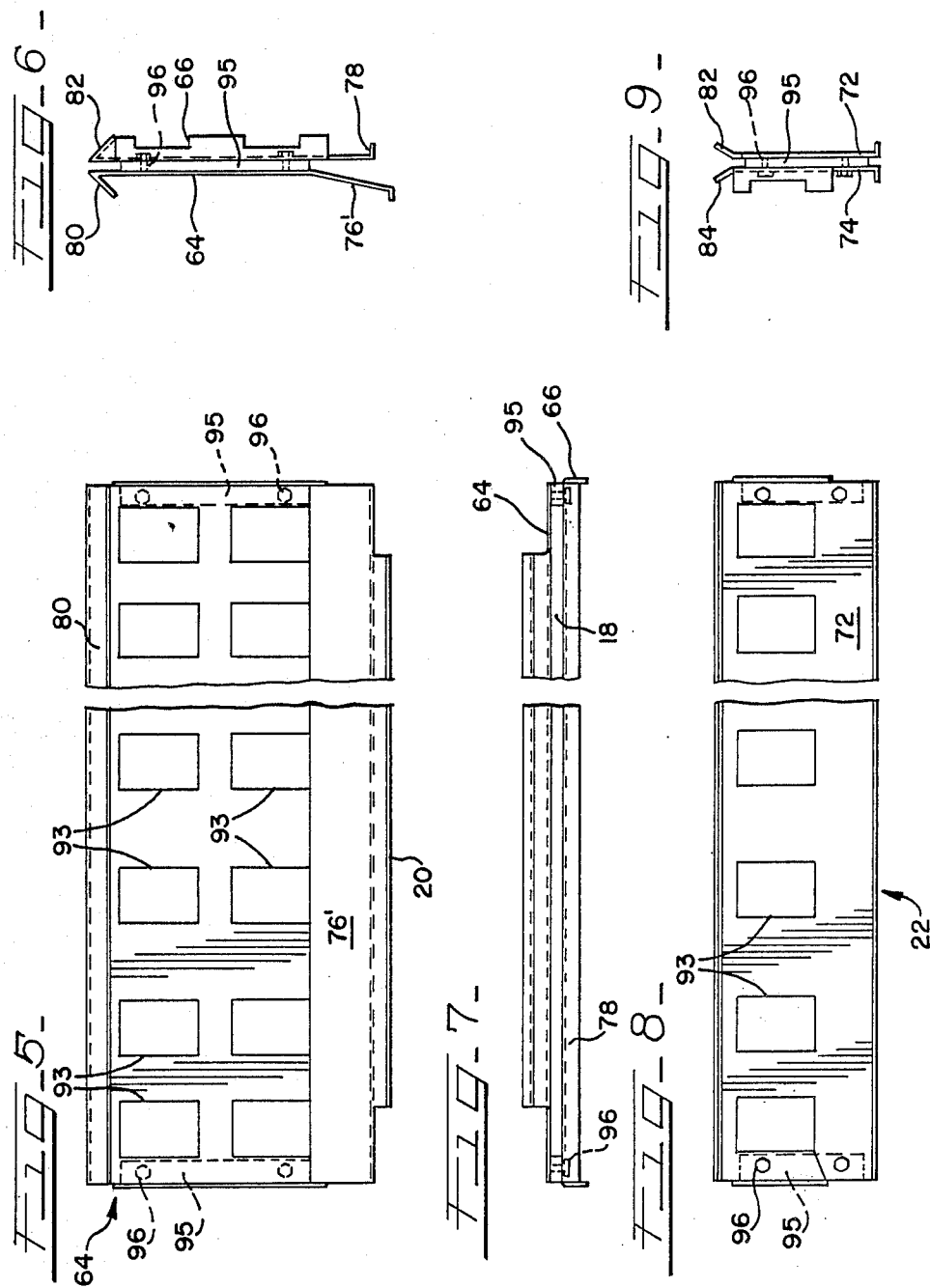

CONTACT EXPOSURE UNIT

BACKGROUND OF THE INVENTION

The present invention relates to contact exposure units used in the photographic reproduction of large sized drawings or blueprints, and, more specifically relates to a contact exposure unit adapted to accommodate varying thicknesses of sheet material as well as maintain the original and light sensitive sheets in registry with each other.

Conventional contact exposure units include a housing with a transverse horizontal slot extending from a front or infeed end to a rear or exit end. Upper and lower margins of the slot are provided with a plurality of opposed pairs of fixed upper and lower cylindrical rolls, each roll having a covering of some sort of resilient, rubber-like material. At least one of the rolls is driven so as to pull the sheet materials through the slot. An endless belt is often used to draw the sheets through the unit. A light unit is mounted in the housing to expose sheet materials inserted through the slot for reproduction. For the purposes of the present invention, "sheet materials" refers to the original drawing or blueprint, and the light sensitive reproduction sheet, the latter often being some sort of film. For successful reproductions, the original must be transparent or translucent to allow light to penetrate therethrough.

In operation, the original and the light sensitive sheet are placed in registry with each other and are inserted into the slot with the original closest to the light unit, the original being either face up or face down. As the rolls or the belt pull the sheets through the slot, the light unit is illuminated, which exposes the light sensitive sheet except for areas where masked by lines on the original, creating a latent image. Once exposed, the light sensitive sheet may be transferred to a separate developer unit for further processing.

A drawback of conventional exposure units is that the arrangement and operation of the rolls tends to cause the original and light sensitive sheets to shift relative to each other so that accurate registry is not maintained. This results in unsatisfactory reproductions, especially when the original includes paste-ups or stuck-on portions.

Another drawback of conventional exposure units is that they require complicated static electricity generators, glass panels, or vacuum units to maintain the sheets in a flat condition for accurate exposures.

A further drawback of conventional exposure units is that the fixed separation between the upper and lower rolls renders the unit unable to adequately accommodate originals and/or light sensitive sheets of varying thicknesses.

A still further drawback of conventional exposure units is that the light unit is unable to direct the light to sufficiently illuminate the original to create a sharp latent image on the contact sheet so that line weights in the reproduction are consistent with the original Thus, there is a need for a contact exposure unit which is adapted to maintain accurate registry between the original and the light sensitive sheet, to accommodate sheet materials of varying thicknesses, and to provide a light unit which creates sharp, and accurate latent images.

SUMMARY OF THE INVENTION

Accordingly, a contact exposure unit is provided having a housing with an upper portion, a lower portion, and a transverse, generally horizontal slot therebetween, the slot extending through the housing from a front or infeed end to a rear or exit end.

A plurality of pairs of opposing upper and lower rolls are provided and are disposed within the housing so that the lower rolls are mounted to the lower housing portion in spaced, parallel relationship to each other so that roll portions extend into the slot. The upper and lower rolls are adapted for axial rotation. The lower rolls are driven, as by a motor through a pulley and v-belt mechanism. The upper rolls are also disposed in spaced, parallel relationship to each other to project into the slot; however, the upper rolls are mounted to the upper portion of the housing so as to freely slide vertically. Thus, upon insertion of sheet material into the slot, the upper rolls will move vertically to accommodate sheets of varying thicknesses. The upper and lower rolls also are of lightweight construction to minimize deformation of the sheet material and to maintain the sheets in registry.

Each upper and lower roll is provided with a plurality of annular resilient segments in spaced, circumscribing relationship along the tubular core of the roll. The segments are fabricated of a soft, foam-like material which allows the nip between the opposing upper and lower rolls to maintain the registry of the sheet material as well as to aid in the accommodation of varying thicknesses of sheet material. The upper rolls are driven by the lower rolls through contact between the opposing resilient segments.

In addition, a light unit is provided including a fluorescent type aperture lamp bulb with a transparent gap facing downward so as to focus a line of light upon the sheet material for optimum clarity.

BRIEF DESCRIPTION OF THE DRAWINGS

FIG. 1 is a front perspective elevational view of the contact exposure unit of the invention;

FIG. 1a is a front perspective elevational view of the exposure unit shown in FIG. 1, shown with the sheet support trays in the folded position;

FIG. 3 is a front elevational view of the roll assembly of the present exposure unit;

FIG. 4 is a side elevational view of the assembly depicted in FIG. 3;

FIG. 5 is a plan view of the upper front guide plate of the present exposure unit;

FIG. 6 is a side elevational view of the guide plate depicted in FIG. 5;

FIG. 7 is a front elevational view of the upper and lower front guide plates;

FIG. 8 is a plan view of the upper rear guide plate of the present exposure unit;

FIG. 9 is a side elevational view of the guide plate shown in FIG. 8; and

DESCRIPTION OF THE PREFERRED EMBODIMENT

Figure 2:
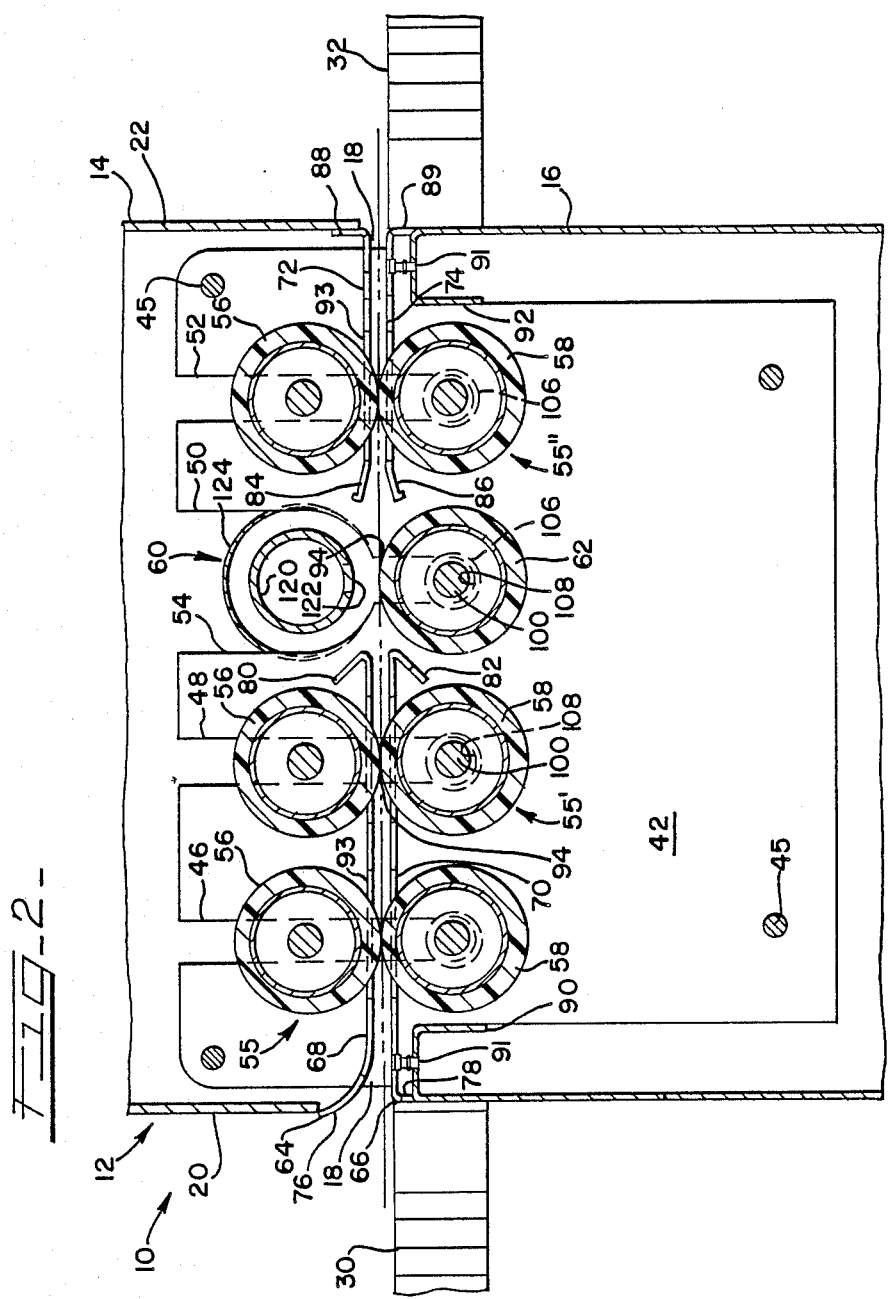
FIG. 2 is a sectional elevational view taken along the line 2—2 of FIG. 1 in the direction indicated generally, with portions omitted for clarity.

Referring now to the drawings, wherein like features are identified by identical reference characters, FIG. 1 depicts the contact exposure unit of the invention, generally designated 10. The unit 10 includes a housing 12 having an upper portion 14 and a lower portion 16, the two portions 14 and 16 being substantially separated by a transverse, generally horizontal slot 18. The housing 12 also has an infeed or front end 20 and an exit or rear end 22. The slot 18 extends through the housing 12 from the inlet end 20 to the exit end 22. Sheet materials 23, including a translucent or transparent original 25 and a light sensitive sheet 27 are shown being inserted into the slot 18 at the front end 20. Original sheets 25 may include engineering reproduction films, washable films, electrostatic film or paper, vellum paste-ups, photo drawings in other standard media used in conventional contact exposure units. The light sensitive sheet 27 may be made of conventional contact reproduction type film.

A pair of vertical side support legs 24, 26, each having a foot 28 are secured to each side of the housing 12 so as to elevate it to a working height. The unit 10 is further provided with front and rear sheet support trays 30, 32 respectively which are hinged to allow the trays to fold down to facilitate transport of the unit 10 (best seen in FIG. 1a).

The upper portion 14 of the housing 10 is provided with a suitable control panel 34 having appropriate control devices 36 and indicators as is common in such contact exposure units. Included among such control devices 36 is a speed adjustment which, by varying the speed at which sheet materials pass through the unit 10, is used to adjust the exposure time. In addition, the upper portion 14 is provided with a plurality of ventilation louvers 38 at each side thereof to promote air circulation for the electronic circuitry contained therein, including an exposure light unit. If desired, an internal ventilation fan (not shown) may be provided in the upper housing portion 14 to increase air circulation. An access lid 40 is provided in a top 41 of the upper housing portion 14 to permit access thereto. In the preferred embodiment, the access lid 40 is hinged (best seen in FIG. 1a).

Referring now to FIG. 2, the unit 10 further includes a pair of roll support endplates 42 and 44 located at each side end thereof (the endplate 44 best seen in FIG. 4). The endplates 42, 44 are secured to each other as by tie rods 45 (best seen in FIG. 3) and are also secured to the housing 12. The endplates 42, 44 are provided with a like plurality of corresponding vertical U-shaped slots 46, 48, 50, 52. Although the slots 46–52 number four in the preferred embodiment, the exact number of slots may vary as to the number of roll pairs provided in the unit 10. The configuration of the slots 46–52 is generally parallel-sided, however, the slot 50 is provided with a widened upper portion 54. The unit 10 is also provided with a plurality of upper and lower roll pairs 55, the upper rolls designated 56 and the lower rolls designated 58. Each roll pair 55 is associated with a respective slot 46, 48 and 52. The slot 50 is not associated with a roll pair 56, but instead is associated with an exposure light unit 60 and a lower pressure roll 62.

A pair of upper and lower feed guide plates 64 and 66 are located within the housing and define the slot 18. In the preferred embodiment, the upper and lower guide plates 64 and 66 are each provided with a respective front portion 68, 70 and a respective rear portion 72, 74. The guide plates 64, 66 are designed to facilitate the insertion of sheets into the slot 18, as well as to prevent the often curled, torn or wrinkled sheet materials 23 from curling upward or downward and becoming caught between adjacent upper or lower rolls 56, 58.

Accordingly, the upper front guide plate 68 has an upwardly curved front portion 76 and the lower front guide plate 70 has a depending lip portion 78 which opposes the front support platform 30 and provides a continuous surface therewith for the passage of the sheet materials 23 through the unit 10. The upper and lower front guide plates 68 and 70 are also provided with a rear lip portion 80, 82, respectively, each of which is angled so as to provide structural stiffness for the plates. In similar fashion, the upper and lower rear guide plates 72 and 74 are provided with an angled front portion, 84, 86 respectively, which taken together form a funnel shape to direct sheet materials within the slot 18 once they pass the light unit 60. The upper and lower rear guide plates 72 and 74 are secured to housing 12 by the vertically projecting flanges 88 and 89 respectively. In addition, the lower front guide plate 70 is secured to a housing bracket 90 by fasteners 91. Likewise, the lower rear guide plate 74 is secured to a bracket 92 by fasteners 91.

Referring now to FIGS. 2, 5 and 8, both the upper and lower feed guide plates 64 and 66 are provided with a plurality of roll pockets 93, which are essentially rectangular apertures stamped into each plate. Although only upper guide plate 64 is depicted in FIGS. 5 and 8, it will be appreciated that the plate 66 is a mirror image of the plate 64. The pockets 93 are disposed on the plates 64 and 66 so as to correspond to the position of the corresponding rolls 56 and 58. Each pocket 93 is dimensioned to allow portions of the rolls 56 and 58 to project therethrough to be in contact with each other and to form a nip 94 therebetween (the nip 94 best seen in FIGS. 2 and 3). The separation of the plates 64 and 66, and the height of the slot 18, is maintained by spacer bars 95 (best seen in FIGS. 6 and 9) which are secured to the upper and lower plates by suitable fasteners 96 such as threaded bolts or rivets.

Referring now to FIG. 3, details of a roll pair 55 are shown. Each roll 56, 58 includes a hollow tubular core 98 through which a rigid stub shaft 100 is inserted at each end. Light roll weight is important to the optimum operation of the present invention, and, as such, the core 98 is fabricated of aluminum or equivalent light alloy having relatively thin walls, preferably in the range of 0.050 to 0.125 inches. The axial position of the shafts 100 relative to the core 98 is maintained by a pair of core end caps 102 (shown hidden in FIG. 3) which are secured in the open ends of the core 98. Each core 98 is provided with a plurality of annular segments or tires 104 which circumscribe the core and are located in spaced relationship to each other along the length thereof. The segments 104 are secured to the core by adhesive. A like number of segments 104 are provided to corresponding upper and lower rolls 56 and 58 in directly opposing contacting relationship to each other. The segments 104 are preferably fabricated of a resilient material such as a soft foam of polyester, polyethylene, polypropylene, polyurethane, copolymers thereof, or equivalent material.

The roll stub shafts 100 are disposed for sliding movement relative to the roll end plates 42 and 44 by means of a slide bearing 106 fabricated of a low friction polymeric material such as NYLATRON brand nylon produced by Polymer Corporation of Reading, Pa.

Referring now to FIGS. 2, 3 and 4, it will be evident that the upper rolls 56 are essentially idler rolls designed to be vertically slidable in the U-shaped slots 46, 48, 52, the position of the upper rolls 56 in the respective slots 46, 48, 52 being determined by contact between the segments 104 of the upper roll with the opposing segment 104 of the lower roll 58. The presence of sheet materials 23 in the slot 18 may cause the upper rolls 56 to move vertically, depending on the thickness of the sheet materials.

In contrast to the vertically slidable orientation of the upper rolls 56, the lower rolls 58 are held in essentially fixed position in the slots 46, 48, 50, 52, and the lower pressure roll 62 is essentially fixed within the slot 50, by the bearing 106 resting at the bottom 108 of the respective slots (best seen in FIG. 2).

The lower rolls 58 and the pressure roll 62 are driven by means of an electric motor 110 (best seen in FIG. 10) having a drive pulley 112 and primary and secondary belts, 114 and 116 respectively, which are adjusted so as to drive all of the rolls 58 and 62 at a uniform speed and in a uniform direction.

Accordingly, each of the lower rolls 58 and 62 are provided with at least one pulley wheel 118 adapted for a V-belt drive system, with the innermost or transfer pulleys being equipped with an additional wheel 118' to accommodate both belts 114 and 116.

Figure 10:
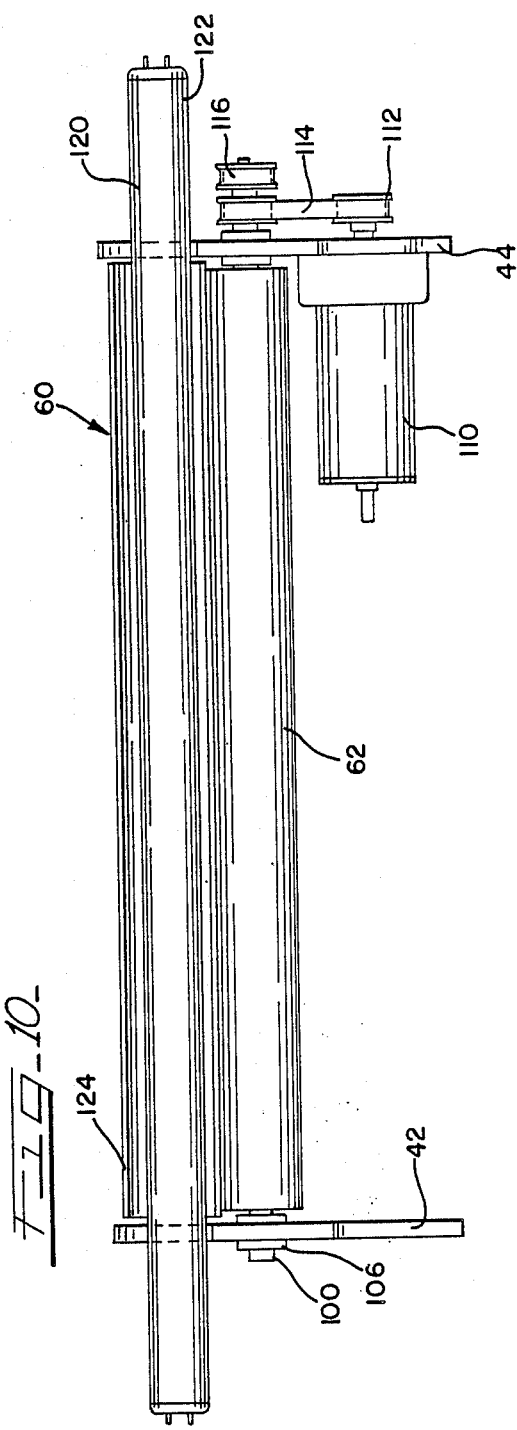
FIG. 10 is a front elevational view of the light unit and opposing lower roll of the exposure unit of the invention.

Referring now to FIG. 10, the relationship between the light unit 60 and the pressure roll 62 is depicted in greater detail. The light unit 60 includes a fluorescent type ultraviolet aperture bulb 120 having a generally frosted exterior, with the exception of a narrow transparent gap 122 in the frosting running the length of the bulb. The bulb 120 is mounted within the housing 12, with the gap 122 facing downwardly toward the slot 18 (best seen in FIG. 2) so as to concentrate or focus the available light upon the translucent or transparent original 25 (best seen in FIG. 1). This disposition of the bulb 120 results in the production of a sharper latent image upon the light sensitive sheet 27 (best seen in FIG. 1).

A clear glass tube 124 is loosely positioned within the upper housing portion 14 and between the endplates 42 and 44 so as to circumscribe the bulb 120 and to be in opposing contact with the pressure roll 62. The tube 124 is retained in position by at least four vertical bracket members 125 (two of which are shown hidden in FIG. 4), and thus may rotate axially upon contact with the pressure roll 62. The tube 24 is dimensioned to approximate the circumference of the upper rolls 56. The pressure roll 62 is distinguishable from the lower rolls 58 in that instead of having a plurality of segments 104, it is provided with a continuous covering of a similar foam material as is used for the segments 104. The pressure roll 62 and the glass tube 124 are configured so that sheet materials 23 passing through the slot 18 are pressed firmly together in the nip 94 between the tube 124 and the roll 62 for a more accurate exposure upon the light sensitive sheet 27.

In operation, an original transparent or translucent sheet 25 is placed either face up or face down upon a light sensitive sheet 27. The sheets 23 are positioned to be in registry with each other upon the front support tray 32 and are inserted into the slot 18. The width of sheet materials 23 passed through the unit 10 is governed by the distance between at least the outermost opposing foam segments 104' on the upper and lower rolls 56 and 58. This is because the upper rolls 56 are driven principally by contact with the lower rolls 58, and such contact should be maintained for optimum operation of the unit 10, although some of the driving force generated by the lower rolls 58 may be transmitted through the sheet material 23 to the upper rolls 56. The unit 10 of the preferred embodiment is capable of exposing sheets 23 having widths from approximately 8 inches to 45 inches and having a length from about 11 inches to 20 feet.

The sheets 23 are placed in the nip 94 of the first roll pair 55 between the upper rolls 56 and the lower drive rolls 58, with the vertically slidable upper rolls moving slightly upwardly to accommodate the sheets. In this arrangement, the weight of upper rolls 56 will rest upon the sheets 23, and with the combination of the light weight roll construction and the softness of the foam segments 104, the sheets are not disfigured or mangled, and are retained in registry. It has been found that the present apparatus maintains the registry of the sheets 23 within ±0.004 inch.

As the sheets enter the nip 94 of the first roll pair 55 the driving action of the motor 110 and pulley system 112–118 maintains a uniform drive speed of sheets through the slot 18. The unit 10 is capable of achieving a range of throughput speeds approximately from 4 to 8 FPM. Although two roll pairs (55 and 55') are depicted in front of the light unit 60, any number of such roll pairs 55 may be added as required by a specific application.

The sheets 23, traveling at a speed determined by the control 36 are eventually conveyed into the nip 94 between the glass tube 124 and the pressure roll 62. The two sheets 23 are pressed together and the lamp 120 illuminates, creating a latent image upon the light sensitive sheet 27. The sheets 23 are then passed to a last roll pair 55" prior to exit from the upper housing portion 14 and upon the rear support tray 34.

If, after processing, the resultant reproduction is too dark, by adjustment of the control 36 the speed of the drive rolls 58 may be decreased for a subsequent reproduction. Accordingly, if the reproduction is too light, the roll speed may be increased.

Thus, the present invention provides a contact exposure unit which, due in part to its lightweight roll construction, slidable upper roll mounting arrangement, and segmented soft roll covering, can rapidly produce precise exposures while maintaining the sheets in registry and avoiding any damage thereto.

While a particular embodiment of the contact exposure unit of the invention has been shown and described, it will be appreciated by those skilled in the art that changes and modifications may be made thereto without departing from the invention in its broader aspects and as set forth in the following claims.

I claim:
1. A contact exposure unit comprising:
   a housing having an inlet end, and outlet end, an upper portion and a lower portion, said upper and lower portions being substantially separated by a transverse slot extending through said housing from said inlet end to said outlet end;
   a plurality of lower rolls disposed for axial rotation in spaced parallel arrangement to each other in said lower portion of said housing and having portions projecting into said slot, said lower rolls being fixed in position along a generally horizontal line extending generally from said inlet end to said outlet end;

means for driving said lower rolls;

a like plurality of upper rolls disposed for axial rotation in spaced parallel arrangement to each other in said upper portion of said housing and having portions projecting into said slot;

said upper rolls being adapted to slide vertically in said housing to contact said lower rolls at said respective projecting portions, said upper and lower rolls forming a nip to support and convey sheet material through said slot from said inlet end to said outlet end; and light means for exposing the sheet material inserted through said slot.

2. The exposure unit as defined in claim 1 wherein said upper and lower rolls include an elongate core and a plurality of resilient annular segments circumscribing said core and disposed in spaced relationship to each other.

3. The exposure unit as defined in claim 2 wherein said segments are fabricated of a synthetic foam material.

4. The exposure unit as defined in claim 2 wherein said segments on said upper rolls are disposed directly opposite said segments on said lower rolls.

5. The exposure unit as defined in claim 4 wherein said upper rolls are driven only by contact between said opposing segments of said upper and lower rolls.

6. The exposure unit as defined in claim 1 wherein said upper rolls are driven only by contact with said lower rolls.

7. The exposure unit as defined in claim 1 wherein said means for driving said lower rolls includes a motor with a V-belt and pulley arrangement.

8. The exposure unit as defined in claim 1, wherein said light means is disposed in said upper portion of said housing on a general horizontal plane with said upper rolls.

9. The exposure unit as defined in claim 8 wherein said light means is an aperture lamp enclosed in a glass tube.

10. The exposure unit as defined in claim 9 further including a lower drive roll situated directly opposite said glass tube and in contacting relationship thereto.

11. A contact exposure unit comprising:

a housing having an inlet end, an outlet end, an upper portion and a lower portion, said upper and lower portions being substantially separated by a generally horizontal slot extending from said inlet end to said outlet end;

a plurality of lower rolls disposed for axial rotation in said lower portion of said housing in spaced parallel relationship to each other and having portions projecting into said slot, said lower rolls being fixed in position along a generally horizontal line extending generally from said inlet end to said outlet end;

a like plurality of upper rolls adapted for axial rotation and being disposed in said upper portion of said housing in spaced parallel relationship to each other, each said upper roll being further adapted for low friction vertical sliding action in said housing and having portions projecting into said slot, said upper rolls being disposed directly above corresponding lower rolls;

said upper and lower rolls each including an elongate, generally tubular core surrounded by a plurality of resilient annular segments located in spaced relationship to each other, said segments of opposite upper and lower rolls also being disposed directly opposite each other and in contacting relationship in said slot to form a nip through which sheet material is supported and conveyed from said inlet end to said outlet end;

means for driving said lower rolls; and light means for exposing sheet material inserted through said slot.

12. The exposure unit as defined in claim 11 wherein said upper rolls are driven by contact between opposing said segments of said corresponding upper and lower rolls.

13. The exposure unit as defined in claim 11 further including guide means associated with each of said pluralities of upper and lower rolls.

14. The exposure unit as defined in claim 13 wherein said guide means includes an upper and lower feed guide plate provided with a plurality of pockets, each of said pockets designed to accommodate a portion of one of said roll segments therein.

15. The exposure unit as defined in claim 14 wherein each of said guide plates is provided in a front plate portion and a rear plate portion.

16. The exposure unit as defined in claim 11 wherein said housing is provided with a hinged sheet support tray at each of said inlet end and said outlet end.

17. The exposure unit as defined in claim 11 wherein said light means includes an ultraviolet fluorescent aperture bulb having a downwardly directed gap.

18. The exposure unit as defined in claim 17 wherein said bulb is axially located within a glass tube, said tube being in contacting relationship with a corresponding lower roll.

19. A contact exposure unit comprising:

a housing having an inlet end, an outlet end, an upper portion and a lower portion, said upper and lower portions being substantially separated by a transverse slot extending through said housing from said inlet end to said outlet end;

a plurality of lower rolls disposed for axial rotation in spaced parallel arrangement to each other in said lower portion of said housing and having portions projecting into said slot;

means for driving said lower rolls;

a like plurality of upper rolls disposed for axial rotation in spaced parallel arrangement to each other in said upper portion of said housing and having portions projecting into said slot;

said upper rolls being adapted to slide vertically in said housing to contact said lower rolls at said respective projecting portions, said upper and lower rolls adapted to convey sheet material through said slot;

light means having a glass tube for exposing sheet material inserted through said slot; and a lower drive roll situated directly opposite said glass tube and in contacting relationship thereto.

20. A contact exposure unit comprising:

a housing having an inlet end, an outlet end, an upper portion and a lower portion, said upper and lower portions being substantially separated by a generally horizontal slot extending from said inlet end to said outlet end;

a plurality of lower rolls disposed for axial rotation in said lower portion of said housing in spaced parallel relationship to each other and having portions projecting into said slot;

a like plurality of upper rolls disposed for axial rotation in said upper portion of said housing in spaced parallel relationship to each other, each said upper roll being further adapted for low friction vertical sliding action in said housing and having portions projecting into said slot, said upper rolls being disposed directly above corresponding lower rolls;

said upper and lower rolls each including an elongate, generally tubular core surrounded by a plurality of resilient annular segments located in spaced relationship to each other, said segments of opposite upper and lower rolls also being disposed directly opposite each other and in contacting relationship in said slot;

means for driving said lower rolls;

light means for exposing sheet material inserted through said slot; and guide means associated with each of said pluralities of upper and lower rolls, said guide means including an upper and lower feed guide plate provided with a plurality of pockets, each of said pockets designed to accommodate a portion of one of said roll segments therein.

21. The exposure unit as defined in claim 20 wherein each of said guide plates is provided in a front plate portion and a rear plate portion.

* * * * *